United States Patent [19]

Turnbull et al.

[11] 3,803,791

[45] Apr. 16, 1974

[54] DEVICE FOR AND METHOD OF MOUNTING WALL FACINGS

[75] Inventors: William C. Turnbull, Sylvania; William H. Hasselbach, Rossford, both of Ohio

[73] Assignee: William C. Turnbull, Toledo, Ohio

[22] Filed: Dec. 18, 1972

[21] Appl. No.: 316,384

[52] U.S. Cl. ............... 52/506, 52/268, 52/698, 52/748, 52/410, 85/83
[51] Int. Cl. .................... F16b 13/06, E04b 2/14
[58] Field of Search ........... 52/378, 506, 508, 513, 52/617, 698, 746, 747, 410, 268, 741; 85/83, 69

[56] References Cited
UNITED STATES PATENTS

| | | | |
|---|---|---|---|
| 844,944 | 2/1907 | Jacobs | 52/617 |
| 1,846,432 | 2/1932 | Moore | 52/741 |
| 3,367,694 | 2/1968 | Witt | 52/410 X |
| 3,461,772 | 8/1969 | Barry | 85/83 |
| 3,471,183 | 10/1969 | Fischer | 287/189.36 R |
| 3,662,644 | 5/1972 | Flesch et al. | 85/69 |

FOREIGN PATENTS OR APPLICATIONS

| | | | |
|---|---|---|---|
| 248,327 | 12/1963 | Australia | 52/410 |
| 1,289,682 | 2/1969 | Germany | 85/83 |

Primary Examiner—Alfred C. Perham
Attorney, Agent, or Firm—Charles W. Swope

[57] ABSTRACT

The mounting device comprises a cylindrical plastic tube with a split end, a spreading element including a drive pin for radially expanding the split end of the tube, and a cap screw threadable into the opposite or open end. In the method, a pattern of openings in a wall facing panel are aligned with corresponding holes in a substrate, the plastic tubes are inserted through the openings in the panels and their split ends seated in the holes in the substrate; a tool is inserted into the tubes from their open ends to actuate the spreading elements and so expand the split ends of the tubes into binding relationship with the walls of the holes in the substrate; thereafter the tool is removed, and short cap screws are threaded into the open ends of the tubes to close them and hold the facing panel in place while leaving open unoccupied sections within the tubes.

10 Claims, 8 Drawing Figures

DEVICE FOR AND METHOD OF MOUNTING WALL FACINGS

BACKGROUND

1. Field of the Invention

The present invention relates generally to the mounting of wall facing sheets or panels, and more particularly to an improved method and apparatus by which facings and coverings of various kinds can be readily and expeditiously associated or combined with newly built or existing wall structures.

2. Description of the Prior Art

Heretofore it has been required practice in applying facing panels, particularly to existing structures, to first apply furring strips to the wall to be covered and then secure the facing material to the furring strips. This involved considerable difficulty in suitably and adequately anchoring the furring strips, locating them in a manner to provide a sufficiently even and level base for the facing, and packing the voids created between the furring strips to prevent air movement and resulting moisture condensation.

Recently, other ways of supporting wall facings have been suggested that involve the use of "rivets" or "plugs," and in which the inner ends of the plugs extend into, and are expanded into contact with, the walls of holes in existing wood, plaster or concrete walls. Indeed a number of patents, of which U.S. Pat. Nos. 3,461,772, 3,471,183 and 3,662,644 appear representative, have issued in this connection. However these prior suggestions have not successfully solved the many problems encountered, they still leave serious difficulties to be met in carrying out fully effective installations, they are not readily adaptable to varying conditions, and they do not sufficiently reduce the time and cost factors involved.

SUMMARY OF THE INVENTION

According to the present invention, on the other hand, there is provided a greatly simplified but remarkably effective method of and apparatus for mounting wall facings, that remarkably facilitates and improves such installations.

Briefly stated the mounting devices or fasteners of applicants' apparatus can consist of a supply of plastic tubes that are radially expandable at one end, spreaders for expanding those ends of the tubes, and cap screws for closing the opposite ends and for retaining the facing. The mounting can be accomplished by positioning a facing panel in the desired location, sliding the plastic tubes through openings provided in the panel until their expandable ends are seated in corresponding holes in a substrate of the wall to be covered, actuating spreaders within the tubes to wedge the expandable ends in place, and threading the cap screws into the open ends of the tubes.

Consequently it is the primary object of this invention to aid, facilitate, expedite and improve generally the mounting of wall facings.

Another object is to provide an improved method and apparatus for this purpose that is especially effective in resurfacing existing cooler and freezer walls and ceilings, and that permits the fastening of new and impervious surfaces, through any thickness of insulation, to substrates of brick, concrete, wood and other building materials.

Another object is the provision of such a method and apparatus that permits the mounting of facing materials in spaced relation to a substrate in a manner to provide thermal insurance by minimizing heat conductivity between the substrate and the facing.

Another object is to provide, in an apparatus of this character, fastening means that are capable of permanently retaining the facing material in place but that, nevertheless, permit and facilitate removal when desired.

Further objects and advantages will become apparent in the course of the following description when taken in connection with the accompanying drawings.

BRIEF DESCRIPTION OF THE DRAWINGS

In the drawings, wherein like numerals are employed to designate like parts throughout.

DESCRIPTION OF THE PREFERRED EMBODIMENTS

Figure 1:
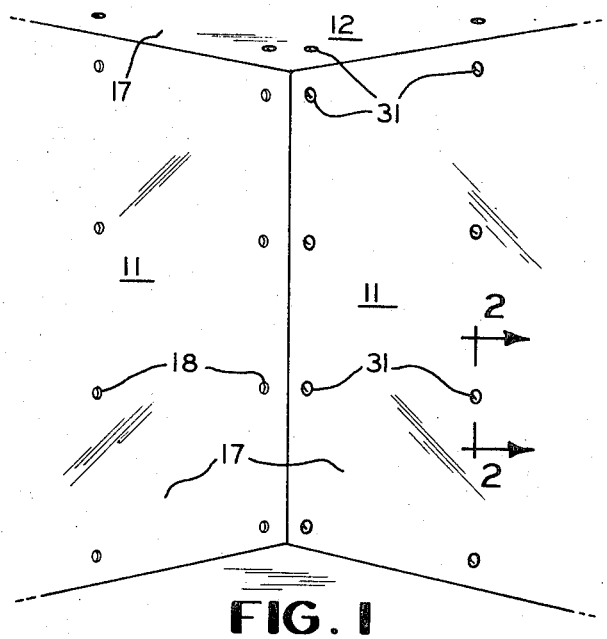
FIG. 1 is a view looking into a corner of a refrigerated room the walls of which are being or have been faced by the method and with the mounting devices or fasteners of the invention.

Referring now more particularly to the drawings, there is illustrated in FIG. 1 a corner of a refrigerated enclosure that has had new facings applied to its existing ceiling and right hand wall, and is in the process of having one applied to its left hand wall, by the method and with the apparatus of the invention.

Although the invention is adapted for use in applying practically any kind of facing to either new or existing walls of any character, with the facing spaced from or in contact with them, its most extensive use to date has been in connection with the application of impervious and readily cleanable facings to existing walls of cooling, freezing or refrigerator rooms, cars, trucks, and the like, where such facings are an important requirement, and it will be shown and described in that connection here.

Figure 2:
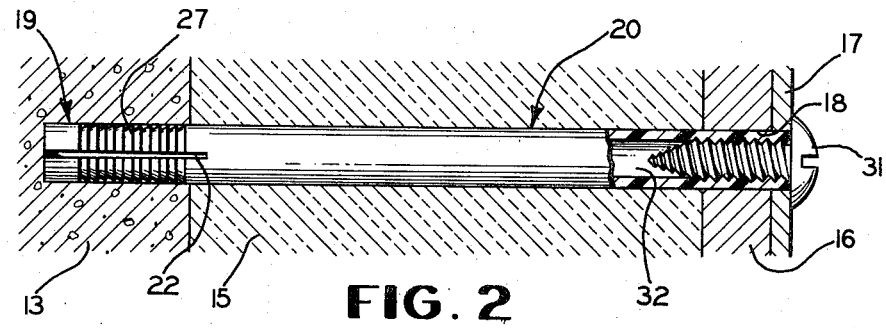
FIG. 2 is a vertical sectional view taken substantially along the line 2—2 of FIG. 1 and showing one of the mounting devices in place.

Thus, the enclosure shown in FIG. 1 is typical of the kind to be treated in that it includes both vertical side and horizontal ceiling walls 11 and 12 respectively and, as can be seen in the sectional view of FIG. 2, embodies a structurally adequate substrate 13 associated with each. Specifically, the substrate 13 as shown is a concrete wall forming part of an enclosing structure within a building that houses the refrigerated enclosure or room of FIG. 1, which is a room that had previously been lined with an insulating layer 15 and provided with a facing layer 16. Such refrigerated rooms or coolers often require new facings, because the old ones become cracked or defaced, or in order to meet more rigid sanitation requirements, or for some other reason that renders the existing surface unacceptable.

In such circumstances a new, completely impervious, facing of plastic, porcelain or the like can be readily and expeditiously installed by the method and with the apparatus of this invention. To that end, according to a preferred procedure, the required number of sheets or panels of the desired facing material are cut to size and provided with drilled openings therethrough in sufficient number and at suitable locations to provide adequate fastening points. Thereafter, as best seen at the left in FIG. 1, each drilled panel 17 (FIG. 1) is located in the desired position to provide its area of the facing and, using the panel as a template and the drilled openings 18 therein as guides, corresponding holes can be drilled through the existing facing 16, the layer of insulation 15, and approximately 1 to 1 ½) inches into the substrate 13 as shown at 19 in FIG. 2.

Figure 3:
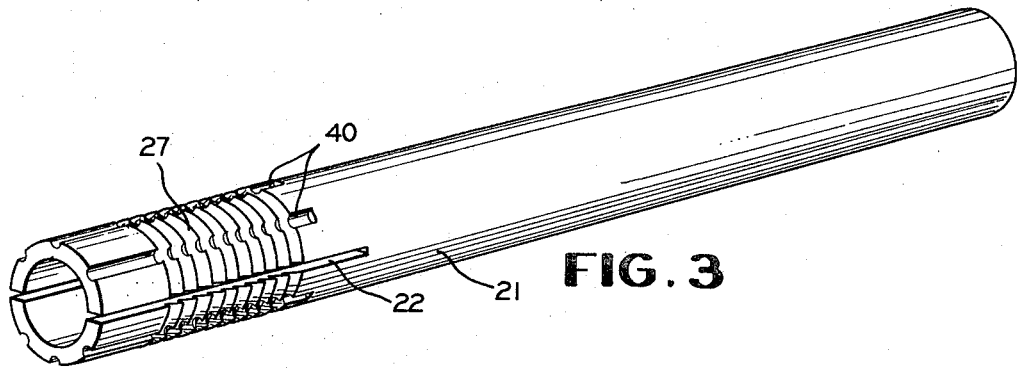
FIG. 3 is a perspective view of one form of tubular member usable as an element of the fastener in the apparatus of the invention.

With this preparatory work completed, the panels 17 are ready for mounting over the existing wall coverings, and securing to the substrate 13, with the fasteners or mounting devices 20 of the invention (FIG. 2). As already indicated these mounting devices each include a tubular member which, as shown in FIG. 3, may be a plastic cylinder 21 split at what is to become its inner end as shown at 22. An expanding means for the split end of the cylinder or tube 21 is also included, and this may be of the spreader, pressure deformable, wedge, or any other type that can be actuated by a suitable tool inserted for that purpose into the outer end of the tube 21.

Figure 4:
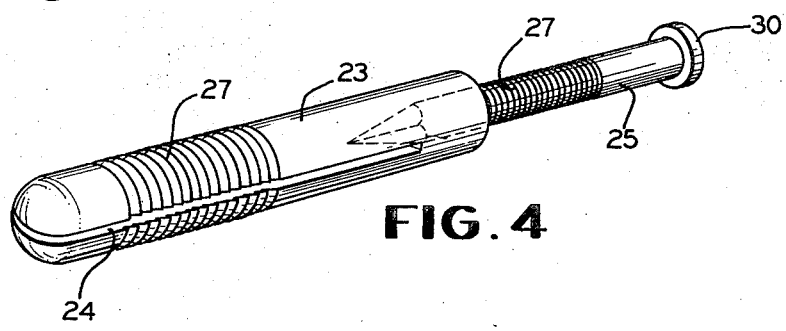
FIG. 4 is a perspective view of a blind-drive plastic rivet adapted for insertion into one end of the tubular member of FIG. 3 as a spreader unit.

For example, as shown in FIG. 4, the expanding means may be a solid plastic rivet 23, also provided with a split end 24, and carrying an axially located metal spreader pin 25 in the unsplit part of the body of the rivet. The rivet 23 is of a diameter adapted to fit snugly into the tube 21 and is assembled for use with it by inserting the rivet, pin first, into the split end of the tube and aligning the split in the rivet with the splits in the wall of the tube.

Figure 5:
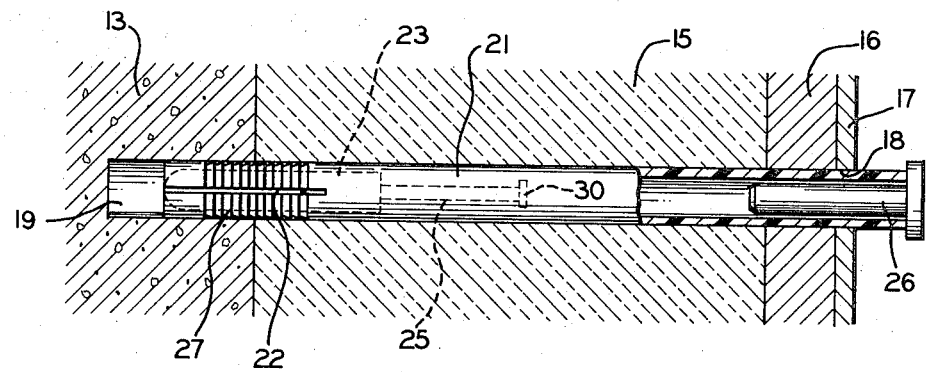
FIG. 5 is a view similar to FIG. 2 but with the mounting device or fixture shown in section and positioned to illustrate some early steps in the method of the invention.

The first step in securing a properly located panel 17 in place is to insert an assembled rivet and tube unit, split end first, into and through one of the openings 18 in the panel, through the existing facing layer 16 and the insulation 15, and into the corresponding hole 19 in the substrate 13 as shown in FIG. 5. Preferably the split end of the tube 21 fits snugly into the hole 19 and it may be desirable to insert a short shafted mandrel 26, having a head of sufficient diameter, into the open end of the tube 21, as also shown in FIG. 5, for the purpose of seating the tube in the hole 19 by lightly tapping the head of the mandrel.

The tubes 21, which can be of any desired, non-corrosive, low heat conducting material, are preferably of a synthetic plastic that is the same as or compatible with that of the rivets 24 and that can be readily cut to whatever finished lengths may be necessary for a particular job. Indeed, one of the advantages of the fasteners of the invention resides in the fact that they can be quickly sized or resized to fit any situation because the tubes 21 can be cut to length in the field, or field trimmed, to correct errors in measuring or to meet unusual or unexpected conditions. Also, any one or all of the walls of the split ends of the tubes and rivets and of the spreader pins may be roughened, barbed, threaded or otherwise treated as at 27 to prevent relative slipping or inadvertant retracting and to provide a more intimate and binding relationship between them and adjacent walls with which they may be brought into engagement.

Figure 6:
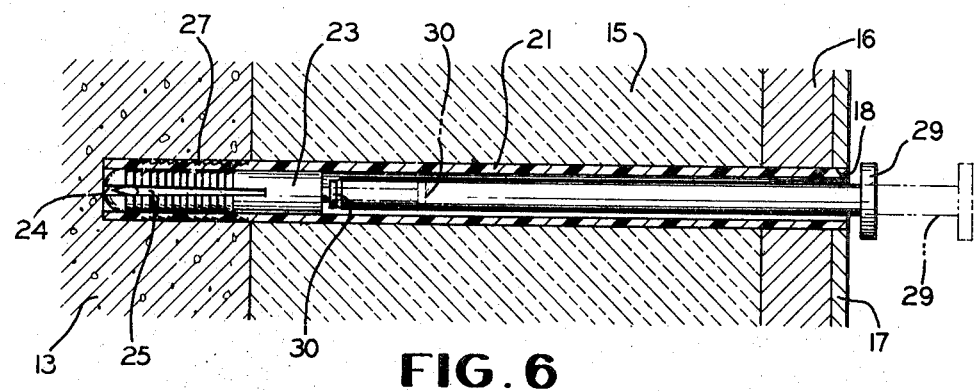
FIG. 6 is a view similar to FIG. 5 but with the mounting device positioned to illustrate some subsequent steps.

With the split end of the tube 21 properly seated in the hole 19 in the substrate 13, the mandrel 26 is removed and, as indicated in broken lines in FIG. 6, a second and longer shafted mandrel 29 can then be inserted into the open, outer end of the tube and against the head 30 of the pin 25. By striking the head of the mandrel 29 the pin, as shown in full lines in FIG. 6, will be driven into the split end of the rivet 23 thus spreading it apart and causing it to press against the walls of the tube 21 which, by reason of being correspondingly split, will be radially expanded to force the outer walls of the tube into binding relationship with the wall of the hole 19 in the substrate, and so will wedge the inner end of the fastener 20 into tight engagement with the substrate 13. Where the substrate is of concrete, wood, or other porous or surface pervious material, the roughened areas 27 on the outer surfaces of the tube will create an interlocking as well as a wedged relationship at the contacting faces of the fastener 20 and the substrate 13.

It then only remains to insert and thread a short non-corrosive cap screw 31 into the open end of the tube 21 until it engages the facing panel 17 (FIGS. 1 and 2) and locks the same in place. A cap screw 31 of the proper size can, of course, be threaded into the plastic tube without advance preparation being required and, at the same time, provides an adjusting feature that makes it possible to control the amount of pressure exerted against the panel 17 by merely threading the cap screw further into or out of the tube. This is particularly important in cases where plastic, or other flexible and-/or deformable facing materials are used because it makes possible the creationof smooth, even and accurately aligned surfaces under what have heretofore been considered to be extremely difficult if not impossible circumstances.

Another important feature is that the location of the spreading element at and its confinement to the inner end of the tube 21, and the location of the cap screw 31 at and its convinement to the outer end of the tube in spaced relation to the spreading element, leaves an open and unoccupied section 32 (FIG. 2) within the tube that restricts any possible conduction of heat through the mounting devices to the thin, low heat conducting plastic walls of the tubes 21. It also makes it possible to field cut the tubes to desired or required lengths without affecting or interfering with the spreader or closure elements of the fasteners.

Figure 7:
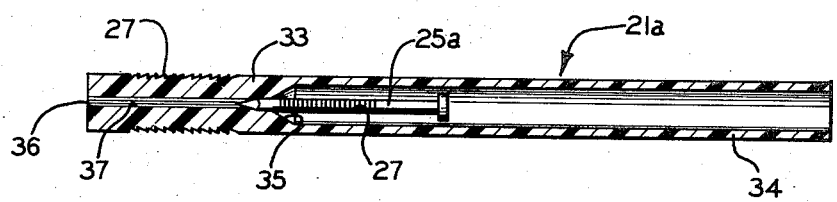
FIG. 7 is a sectional view through a modified form of tubular member contemplated by the invention.

A slightly modified form of the tubular member of the fastener of the invention is shown in FIG. 7 of the drawings. There, a tubular member 21a is molded with one end 33 in solid or rod like form, with the remainder of its length 34 in cylindrical form, and with the inner wall of the cylindrical portion terminating toward the solid end in a cone shape 35. The solid end of the member 21a is split as at 36, to make that end expandable or spreadable, and may be provided with a bore 37 to accommodate a spreader pin 25a of larger diameter than the bore. The spreader pin can be assembled with the tubular member prior to use by inserting its pointed end within the bore 37 as indicated in FIG. 7. However, with this form of tubular member, the pin 25a may be loose in the cylindrical part of the member. Or it may be inserted into the cylindrical part in the field and pushed into operable position with a mandrel 29 or the like, being guided into place by the cone shaped wall 35, prior to using the mandrel to drive the spreader pin into the split solid end of the tubular member.

Another feature that may be employed with the tubular members illustrated in either FIG. 3 or FIG. 7 is to cut or incorporate longitudinal flutes or similar passageways in the outer walls of their split ends as shown at 40 in FIG. 3. These are useful in case the substrate 13 is provided with a vapor barrier and the barrier is badly ruptured in drilling the holes 19. Under these circumstances it is often desirable to insert a supply of sealing compound into the holes 19 before seating the tubular members therein and, while this compound can travel upwardly from the bottoms of the holes 19 along the splits in the tubular members, the presence of the flutes 40 facilitates its passage into the area of the breaks in the vapor barrier to insure that the openings are completely sealed.

Figure 8:
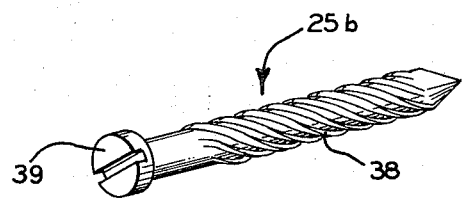
FIG. 8 is a perspective view of a modified form of spreader pin.

Also, a modified form of spreader pin is illustrated in FIG. 8 where the pin 25b may be said to be a screw-nail. That is, it includes a helically threaded shank 38, and an apertured head 39 in which the aperture can be a slot as shown, or can be otherwise shaped to receive a Phillips or other screw driver or to accommodate some other form of elongated tool. In any event this modified form of pin can be either driven or threaded into place to provide as secure and permanent a fastening means as the type of pin previously described. However, it can also be retracted by the use of a suitable tool, and so permits and facilitates removal of the fastening device if necessary or desirable.

It will further be apparent that, while the invention has been specifically described in connection with mounting new wall facings directly against and in contact with existing wall structures, that it can as well be employed in applying various types of facing materials in spaced relation to either new or existing wall structures by the use of suitable spacer elements either associated with, attached to, or formed on the tubular members of the mounting devices.

Similarly, tubes of cross sectional shapes other than cylindrical with a variety of different kinds of expanding means can, of course, be employed. Indeed, it is to be specifically understood that the forms of the invention herein illustrated and described are to be taken as preferred embodiments only of the same, and that numerous changes in the shape, size and arrangement of parts, as well as various procedural changes may be resorted to without departing from the spirit of the invention as defined in the following claims.

We claim:

1. A mounting fixture for locating and supporting a wall facing panel relative to a substrate, comprising a tubular member having a radially expandable end adapted for insertion into a hole provided in said substrate and an opposite end adapted to align with an opening in said facing panel, means associated with said expandable end of said tubular member for expanding the same and pressing outer wall portions thereof into binding relationship with the wall of said hole in the substrate, and a closure and retaining member independent of said expanding means and insertable into said opposite end of said tubular member in spaced relation to said expanding means but in engagement with said panel, whereby to close said opposite end of said tubular member and retain said facing panel in position relative thereto while maintaining an open unoccupied section therewithin.

2. A mounting fixture as defined in claim 1, in which an end of said tubular member is radially expandable by reason of its being split, and said split end contains a part of said expanding means.

3. A mounting fixture as defined in claim 2, in which said expanding means includes a solid plastic blind-drive rivet inserted into the split end of said tubular member and having a split end aligned with the split in said member, and a spreader pin adapted to be driven axially through said rivet to spread the split ends thereof against the walls of said tubular member to expand said walls radially and wedge them against the wall of said hole in the substrate.

4. A mounting fixture as defined in claim 2, in which the radially expandable end of said tubular member is substantially solid, and said expanding means includes a spreader pin adapted to be driven through said split solid end of said member to expand said split end radially and wedge the outer walls thereof against the wall of said hole in the substrate.

5. A mounting fixture as defined in claim 4, in which the inner wall of said tubular member tapers inwardly toward its split end, and terminates in an axially aligned opening of lesser diameter than that of said spreader pin in said solid end.

6. A mounting fixture as defined in claim 2, in which said expanding means further includes a spreader pin having a helically threaded shaft and an apertured head, and said closure and retaining member is a cap screw threaded into the inner wall of said opposite end of said tubular member for adjustment relative thereto.

7. In a method of mounting a wall facing panel in relation to a substrate, the steps of aligning a number of openings provided in the face of and extending through said panel with corresponding holes provided in said substrate, inserting tubular members with radially expandable ends through said openings in said panels and into the holes in said substrate, expanding the expandable ends of said tubular members to press wall portions thereof into binding relationship with the walls of said holes in the substrate, inserting closure and retaining means into the opposite ends of said tubular members and into engagement with said panel but in spaced relation to said expanded ends of said tubular members, to close said opposite ends and retain said panel while leaving open unoccupied sections within said tubular members.

8. A method of mounting a wall facing panel as defined in claim 7, in which said holes are provided in said substrate by locating said panel provided with said openings in a desired position relative to said substrate, and drilling said holes in said substrate through the openings in said panel.

9. In a method of mounting a wall facing panel as defined in claim 7, in which the ends of said tubular members are expanded by a tool inserted into said tubular members from said opposite ends thereof, said tool is then removed, and said opposite ends are closed and said panel is retained by threading cap screws into the inner walls of said tubular members at said opposite ends until the heads of said screws engage said panel.

10. A method of mounting a wall facing panel as defined in claim 9, wherein a panel of flexible material is employed, and said cap screws are adjusted relative to the exposed surface of said panel by threading said screws in and out until said exposed surface is substantially flat and even.

* * * * *